(12) United States Patent
Carignan et al.

(10) Patent No.: US 11,225,401 B2
(45) Date of Patent: Jan. 18, 2022

(54) CIRCUIT AND METHOD FOR CONTROLLING ELECTRIC POWER DELIVERED TO AN ELECTRIC MOTOR

(71) Applicant: SOUCY INTERNATIONAL INC., Drummondville (CA)

(72) Inventors: Charles Carignan, Sherbrooke (CA); Gervais Gagnon, McMasterville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 420 days.

(21) Appl. No.: 16/250,080

(22) Filed: Jan. 17, 2019

(65) Prior Publication Data

US 2019/0225466 A1    Jul. 25, 2019

Related U.S. Application Data

(60) Provisional application No. 62/619,336, filed on Jan. 19, 2018.

(51) Int. Cl.
| | |
|---|---|
| *B66D 1/48* | (2006.01) |
| *B66D 1/00* | (2006.01) |
| *B66D 1/58* | (2006.01) |
| *H02P 7/03* | (2016.01) |
| *B66D 1/12* | (2006.01) |

(Continued)

(52) U.S. Cl.
CPC ............... *B66D 1/485* (2013.01); *B66D 1/00* (2013.01); *B66D 1/12* (2013.01); *B66D 1/58* (2013.01); *H02P 7/05* (2016.02); *H02P 7/20* (2013.01); *G05B 15/02* (2013.01)

(58) Field of Classification Search
CPC . B66D 1/525; B66D 3/00; B66D 5/00; B66D 2700/00; G05B 19/416; G05B 11/00; G05B 7/00
See application file for complete search history.

(56) References Cited

U.S. PATENT DOCUMENTS

| | | | | |
|---|---|---|---|---|
| 5,214,359 A | * | 5/1993 | Herndon | H02H 1/0007 318/434 |
| 5,648,887 A | * | 7/1997 | Herndon | H02H 7/085 361/31 |

(Continued)

OTHER PUBLICATIONS

Atmel Corporation, 8-bit Microcontroller with 2/4/8K Bytes In-System Programmable Flash, ATtiny24/44/84, 8006K-AVR-10/10, 2010, 238 pages.

*Primary Examiner* — Said Bouziane
(74) *Attorney, Agent, or Firm* — BCF LLP

(57) ABSTRACT

A method and a circuit for controlling electric power delivered to an electric motor are disclosed. A forward control signal is transmitted when a forward command is received while a forward latch is not set. The forward latch is set and the forward control signal is stopped when a power level of the motor exceeds a threshold while the forward command is received. The forward latch is reset and a reverse control signal is transmitted when a reverse command is received. The reverse and forward control signals are not transmitted when no command is received. A reverse latch is optionally set when the power level exceeds the threshold while the reverse command is received. A winch connected to the motor has a cable wound thereon in a forward direction of the motor and unwound therefrom in a reverse direction of the motor, as controlled by the circuit.

14 Claims, 8 Drawing Sheets

(51) Int. Cl.
*H02P 7/20* (2006.01)
*G05B 15/02* (2006.01)

(56) References Cited

U.S. PATENT DOCUMENTS

| | | | | |
|---|---|---|---|---|
| 6,046,893 | A * | 4/2000 | Heravi | H02H 7/085 318/434 |
| 7,850,145 | B2 * | 12/2010 | Heravi | B66D 1/58 254/275 |
| 8,076,885 | B2 * | 12/2011 | Heravi | H02H 7/0855 318/434 |
| 8,958,956 | B1 * | 2/2015 | Felps | B66D 1/40 701/49 |
| 10,093,523 | B2 * | 10/2018 | Averill | B66D 1/12 |
| 2014/0091268 | A1 * | 4/2014 | Heravi | B66D 1/505 254/274 |
| 2019/0319529 | A1 * | 10/2019 | Yamano | H02M 5/4585 |

* cited by examiner

CIRCUIT AND METHOD FOR CONTROLLING ELECTRIC POWER DELIVERED TO AN ELECTRIC MOTOR

CROSS-REFERENCE

The present application claims priority to U.S. Provisional Patent Application No. 62/619,336, filed on Jan. 19, 2018, the entirety of which is incorporated herein by reference.

TECHNICAL FIELD

The present disclosure relates to the field of power electronics. More specifically, the present disclosure relates to a circuit and a method for controlling electric power delivered to an electric motor.

BACKGROUND

Winches are commonly installed on various vehicles, including for example utility vehicles, all-terrain vehicles, off-road vehicles, and the like. Owing to the availability 12-volt power from a vehicle battery, most winches are equipped with an electric motor.

FIG. 1 (Prior Art) is a block diagram of a conventional circuit for controlling a winch. A circuit 1 comprises a battery 10, a reversible contactor 20, a motor 50 and a user-operable switch 60. The reversible contactor 20 is connected to the battery 10 and to the motor 50 via connectors 22. The reversible contactor 20 is connected to the user-operable switch 60 via a triple connector 24. The connectors 22 and the triple connector 24 may be considered as ideal, zero-impedance elements, that transparently transmit signals and voltages applied thereto. The motor 50 is operatively connected to a winch (not shown) so that rotating the motor 50 in a reverse direction causes the rotation of a cable roll of the winch in a reverse direction for unwinding a cable from the cable roll while rotating the motor 50 in a forward direction cause the rotation of the cable roll in a forward direction for winding the cable on the cable roll.

The battery 10 has a positive terminal 12 and a negative terminal 14. The negative terminal 14 is connected to a ground (GND) reference via negative leads 18. A nominal voltage is available at the positive terminal 12, the nominal voltage being for example +12 volts when the winch is mounted on a vehicle.

The motor 50 has a positive terminal 52 and a negative terminal 54. The user-operable switch 60 has three (3) ports, including a common port 62, an IN port 64 and an OUT Port 68. The common port 62 is electrically connected to the positive terminal 12 of the battery 10 via positive leads 16.

The reversible contactor 20 includes a pair of relays, comprising a forward relay 26 and a reverse relay 28. Each relay includes a coil 30 electrically connected to the GND reference via the negative leads 18. The coil 30 of the forward relay 36 is further connected to the IN port 64 of the user-operable switch 60 via leads 66. The coil 30 of the reverse relay 28 is further connected to the OUT port 68 of the user-operable switch 60 via leads 69. Each relay 26 and 28 also includes four (4) contact points, including a grounded contact point 33 that is electrically connected to the GND reference via the negative leads 18, a power contact point 34 electrically connected to the positive terminal 12 of the battery 10 via the positive leads 16, and a pair of motor contact points 35 and 36. The motor contact points 35 and 36 of the forward relay 26 are connected to the positive terminal 52 of the motor 40 via leads 56 while the motor contact points 35 and 36 of the reverse relay 26 are connected to the negative terminal 54 of the motor 50 via leads 58. Each relay 26 and 28 further includes a movable pole 32. As illustrated on FIG. 1, both coils 30 are de-energized and both movable poles 32 are in their resting positions, connecting the motor contact point 35 to the grounded contact point 33 within each relay 26 and 28.

The user-operable switch 60 has three (3) positions. A first position is a neutral position in which the motor 50 of the winch is not meant to be activated. A second position is a forward position, marked "IN" on the user-operable switch 60, this position being dedicated to winding the cable on the cable roll of the winch. A third position is a reverse position, marked "OUT" on the user-operable switch 60, this position being dedicated to unwinding the cable from the cable roll of the winch. The user-operable switch 60 is constructed so that it cannot be placed in two distinct positions at the same time, all positions being mutually exclusive.

When the user-operable switch 60 is in the neutral position, both the forward relay 26 and a reverse relay 28 are de-energized. At that time, both of the leads 56 and 58 connecting the positive and negative terminals 52 and 54 of the motor 50 are electrically connected to the GND reference via the motor contact points 35 of both relays 26 and 28 that are, at the time, connected to the grounded contact points 33 via the movable poles 32 The motor 50 is not energized.

A user may place and hold the user-operable switch 60 in the forward position. This action causes the common port 62 of the user-operable switch 60 to connect electrically with the IN port 64 of the user-operable switch 60 so that the nominal voltage from the positive leads 16 becomes a forward control signal available at the leads 66 that connect the IN port 64 the user-operable switch 60 and to the coil 30 of the forward relay 26. The coil 30 of the forward relay 26 being energized, its movable pole 32 is displaced and establishes a connection between the power contact point 34 and the motor contact point 36. This causes the application of the nominal voltage from the positive leads 16 via the leads 56 to the positive terminal 52 of the motor 50. At that time, the coil 30 of the reverse relay 28 is de-energized and the leads 58 still connect the negative terminal 54 of the motor 50 to the GND reference. The nominal voltage being applied on the positive terminal 52 of the motor while the negative terminal 54 of the motor is at the GND reference, the motor 50 rotates in the forward direction, causing winding of the cable on the winch.

The user may place and hold the user-operable switch 60 in the reverse position. This action causes the common port 62 of the user-operable switch 60 to connect electrically with the OUT port 68 of the user-operable switch 60 so that the nominal voltage from the positive leads 16 becomes a reverse control signal available at the leads 69 that connect the OUT port 68 of the user-operable switch 60 to the coil 30 of the reverse relay 28. The coil 30 of the reverse relay 28 being energized, its movable pole 32 is displaced to establish a connection between the power contact point 34 and the motor contact point 36. This causes the application of the nominal voltage from the positive leads 16 via the leads 58 to the negative terminal 54 of the motor 50. At that time, the coil 30 of the forward relay 26 is de-energized and the leads 56 still connect the positive terminal 52 of the motor 50 to the GND reference. The nominal voltage being applied on the negative terminal 54 of the motor while the positive terminal 52 of the motor is at the GND reference, the motor 50 rotates in the reverse direction, allowing unwinding of the cable from the winch.

The cable of the winch may become stuck. Alternatively, the cable may be attached to a heavy load or to an unmovable object. In either case, if the user places the user-operable switch 50 in the IN position, in an attempt to wind the cable on the winch, the motor 40 may apply a tension on the cable without actually winding the cable. The motor 40 may overheat, the winch and/or the cable may break. Hazardous conditions may arise if the cable becomes unstuck or breaks.

Therefore, there is a need for improvements in manners of controlling a winch or any other mechanical device coupled to an electric motor.

SUMMARY

According to the present disclosure, there is provided a circuit for controlling electric power delivered to an electric motor. The circuit comprises an input port, an output port, a sensor and a processor. The input port is adapted for receiving a first command and a second command. The output port is adapted for transmitting a first control signal and a second control signal. The sensor senses the electric power delivered to the electric motor. The processor is electrically connected to the input port, to the output port and to the sensor. The processor is adapted for causing the output port to transmit the first control signal when the input port receives the first command while a first latch is not set, setting the first latch and causing the output port to stop transmitting the first control signal when a level of the electric power delivered to the electric motor exceeds a power threshold while the input port receives the first command, resetting the first latch and causing the output port to transmit the second control signal when the input port receives the second command, and causing the output port to stop transmitting the first and second control signals when no command is present at the input port.

In an implementation of the present disclosure, there is also provided a device for controlling electric power delivered to an electric motor. The device comprises the circuit for controlling electric power delivered to an electric motor and a user-operable switch electrically connected to the input port. The user-operable switch has a first position for providing the first command, a second position for providing the second command, and a neutral position. A reversible contactor is electrically connected to the output port and adapted for selectively connecting the electric motor to a power source to cause the electric motor to operate in a first direction when receiving the first control signal at the reversible contactor and to cause the electric motor to operate in a second direction when receiving the second control signal at the reversible contactor.

In an implementation of the present disclosure, there is also provided a winch comprising an electric motor electrically connectable to a battery, a cable roll operatively connected to the electric motor, a cable having one end fixedly attached to the cable roll, and the device for controlling electric power delivered to an electric motor. Operating the electric motor in the second direction causes rotating the cable roll in a reverse direction to allow unwinding the cable from the cable roll. Operating the electric motor in the first direction causes the cable roll to be driven in a forward direction for winding the cable on the cable roll.

According to the present disclosure, there is also provided a method implemented in a controller for controlling electric power delivered to an electric motor. One of a first command and a second command is received at the controller. The electric power delivered to the electric motor is sensed at the controller. When the second command is received at the controller, a first latch is reset at the controller and a second control signal is transmitted from the controller to a reversible contactor electrically connected to the electric motor and to a power source. The second control signal causes the reversible contactor to deliver current from the power source to the electric motor to cause the electric motor to operate in a second direction. When the first command is received at the controller while the first latch is not set, a first control signal is transmitted from the controller to the reversible contactor. The first control signal causes the reversible contactor to deliver current from the power source to the electric motor to cause the electric motor to operate in a first direction. The controller sets the first latch and terminates transmission of the first control signal when the level of the electric power delivered to the electric motor exceeds the power threshold while the first command is being received at the controller. The controller terminates transmission of the first and second control signals when none of the first and second command is received.

The present disclosure further relates to a method of controlling a winch operatively connected to an electric motor. A controller receives one of a first command and a second command from a user-operable switch. The controller senses a level of electric power delivered to the electric motor. When the second command is received at the controller, a first latch is reset at the controller and a second control signal is transmitted from the controller to a reversible contactor electrically connected to the electric motor and to a power source. The second control signal causes the reversible contactor to deliver current from the power source to the electric motor to cause the electric motor and the winch to operate in a reverse direction. When the first command is received at the controller while the first latch is not set, a first control signal is transmitted from the controller to the reversible contactor. The first control signal causes the reversible contactor to deliver current from the power source to the electric motor to cause the electric motor and the winch to operate in a forward direction. The controller sets the first latch and terminates transmission of the first control signal when the level of the electric power delivered to the electric motor exceeds the power threshold while the first command is being received at the controller. The controller terminates transmission of the first and second control signals when none of the first and second command is received.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Various aspects of the present disclosure generally address one or more of the problems of controlling a winch having a cable that may become stuck or attached to an unmovable object as well as the problems of controlling an electric motor coupled to other mechanical devices.

In the present disclosure, terms such as "first", "forward", "first command", "forward command", "first direction" and "forward direction" relate to a rotation of a winch that tends to rewind a cable on the winch—although it will be recognized that the cable may not rewind if, for example, tension on the cable exceeds the capability of the winch. Terms such as "second", "reverse", "second command", "reverse command", "second direction" and "reverse direction" relate to a rotation of the winch that allows unwinding the cable on the winch. The terms "reverse" and "forward" could alternatively be used to respectively refer to winding and unwinding of the cable. It will also be recognized that, in at least some configurations, rotating the winch in the reverse direction may initially cause the cable to become unwound from the winch and that continuous reverse rotating of the winch after the cable is completely unwound may cause rewinding of the cable on the winch. The terms "first", "second"' "forward" and "reverse" are therefore used in a relative sense and are simply used to refer to opposite operating directions of the winch or, more generally, to refer to opposite rotational directions of an electric motor.

Figure 1:
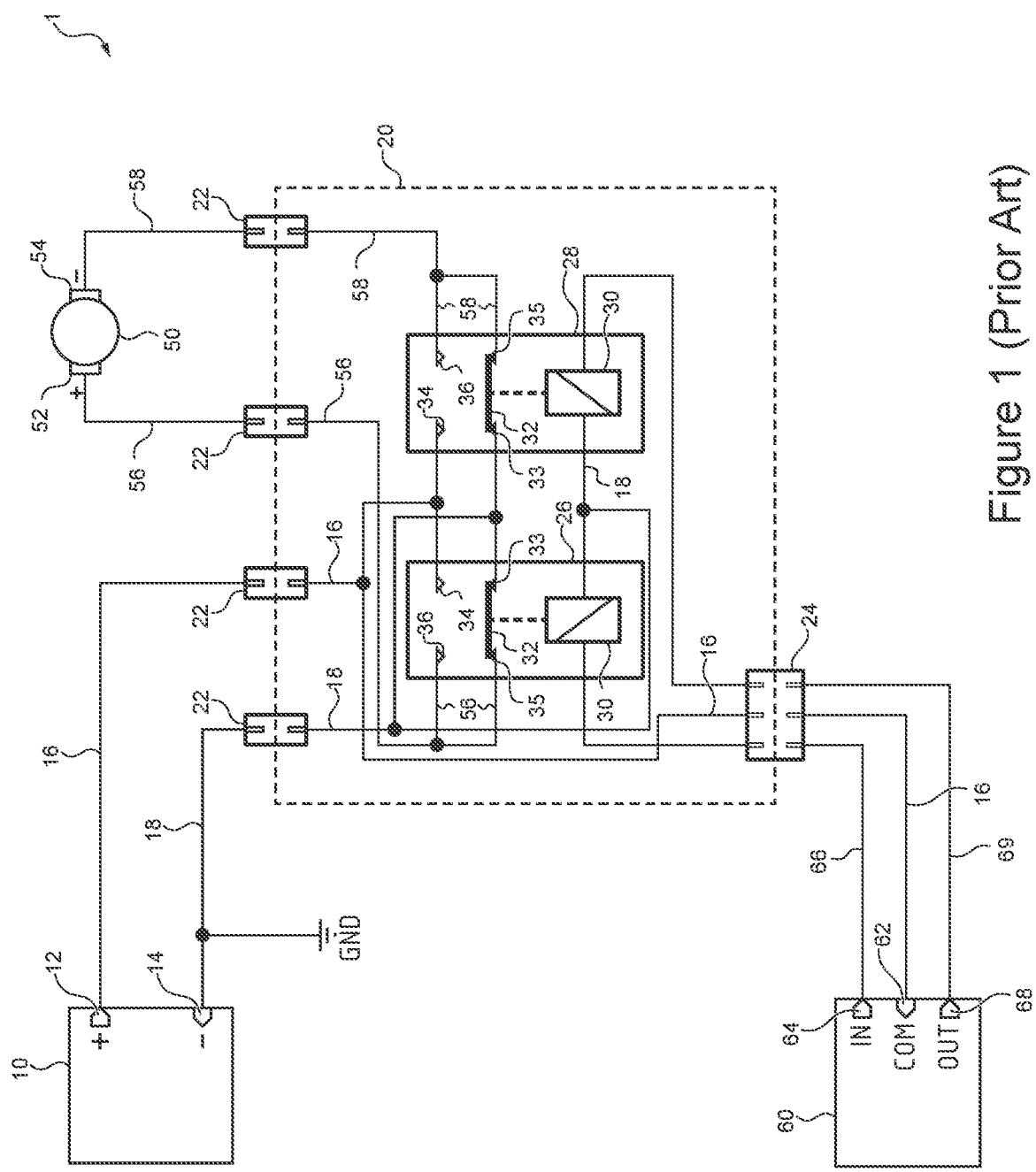
FIG. 1 (Prior Art) is a block diagram of a conventional circuit for controlling a winch.
Figure 2:
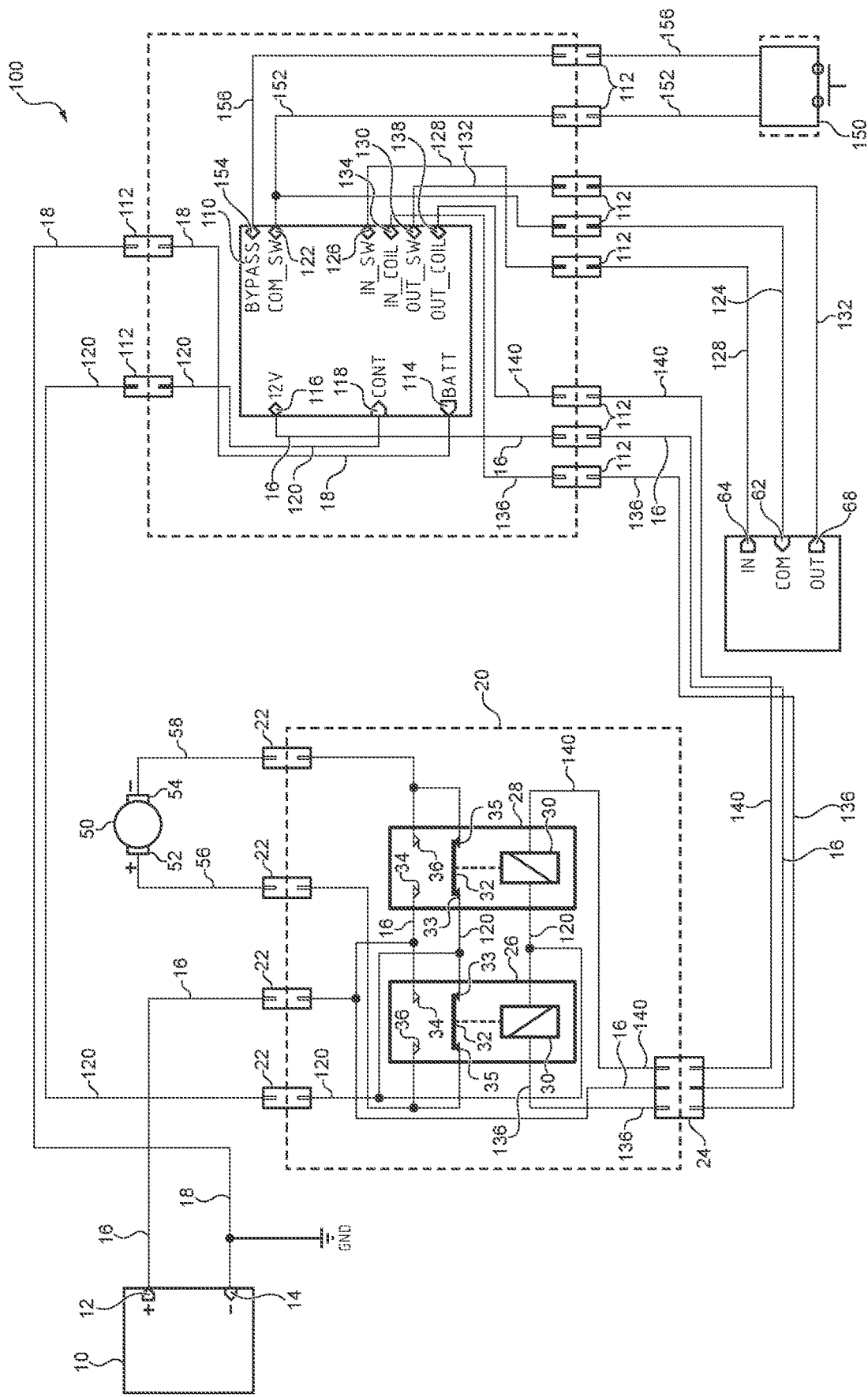
FIG. 2 is a block diagram of a circuit for controlling a winch according to an implementation.

Referring now to the drawings, FIG. 2 is a block diagram of a circuit for controlling a winch according to an implementation. A circuit 100 as illustrated includes most elements of the circuit 1 of FIG. 1, some of which being connected in a different manner. The circuit 100 further includes additional components. One additional component is a circuit card 110, which is connected to the battery 10, to the reversible connector 20 and to the user-operable switch 60 via connectors 112 that, like the connectors 22, may be considered as ideal, zero-impedance elements that transparently transmit signals and voltages applied thereto. An optional other component is a bypass switch 150. Comparing the circuit 1 of FIG. 1 and the circuit 100 of FIG. 2, the user-operable switch 60 is no longer connected to the triple connector 24, being instead connected to the circuit card 110. Outputs of the circuit card 110 are connected to the triple connector 24. The circuit card 110 interprets the various commands from the user-operable switch 60 and further considers operating parameters of the motor 50 before applying forward and reverse control signals to the relays of the reversible switch 20.

The negative leads 18 that electrically connect the negative terminal 14 of the battery 10 and the GND are no longer directly connected to the reversible switch 20. Instead, the negative leads 18 connect to a battery ground port 114 of the circuit card 110. The positive leads 16 still connect the positive terminal 12 of the battery 10 to the power contact point 34. However, other positive leads 16 no longer connect the positive terminal 12 of the battery 10 to the common port 62 of the user-operable switch 60, via the triple connector 24, as in the case of FIG. 1. Instead the positive leads 16 now connect the positive terminal 12 of the battery 10 to a nominal voltage port 116 of the circuit card 110 (the nominal voltage being 12 volts, for example).

The circuit card 110 comprises a shunt resistor (shown in a later Figure) connected in series between the battery ground port 114 and to a contact port 118. The shunt resistor has a very low resistance value so that a voltage present at the contact port 118 is only slightly distinct from the GND reference. Leads 120 connect the contact port 118 of the circuit card 110 to the reversible switch 20. The leads 120 reach, on the reversible switch 20, the grounded contact points 33 and the coils 30 of the relays 26 and 28. Otherwise stated, the parts of the reversible switch that are connected to the GND reference in the circuit 1 of FIG. 1 are now connected to the contact point 118 of the circuit card 110, this contact point 118 being connected to the GND reference via the very low impedance shunt resistor.

The common port 62 of the user-operable switch 60 is connected to a common switch port 122 of the circuit card 110 via leads 124. The common switch port 122 is at a stable 5-volt tension when the circuit card 110 is energized. The IN port 64 is connected to an in switch port 126 via leads 128. The OUT port 68 is connected to an out switch port 130 via leads 132.

When the user places the user-operable switch 60 in the forward position, the user-operable switch 60 electrically connects the common port 62 with the IN port 64. This causes the leads 128 to apply on the in switch port 126 the voltage present at the common switch port 122 and available at the common port 62 via the leads 124. This action effectively applies a forward command to the in switch port 126. The circuit card 110 may conditionally translate this forward command into a forward control signal available at an in coil port 134 and applied via leads 136 to the coil 30 of the forward relay 26. The coil 30 of the forward relay 26 operates in the same manner as when the forward control signal is available at the lead 66 on the circuit of FIG. 1, the movable pole 32 of the forward relay 26 being displaced and establishing a connection between the power contact point 34 and the motor contact point 36, causing the energizing of the motor 50 in the forward direction.

When the user places the user-operable switch 60 in the reverse position, the user-operable switch 60 electrically connects the common port 62 with the OUT port 68. This causes the lead 132 to apply on the out switch port 130 the voltage present at the common switch 122 and available at the common port 62 via the lead 124. This action effectively applies a reverse command to the out switch port 130. The circuit card 110 may conditionally translate this reverse command into a reverse control signal available at an out coil port 138 and applied via leads 140 to the coil 30 of the reverse relay 28. The coil 30 of the reverse relay 28 operates in the same manner as when the forward control signal is available at the lead 69 on the circuit of FIG. 1, the movable pole 32 of the reverse relay 28 being displaced and establishing a connection between the power contact point 34 and the motor contact point 36, causing the energizing of the motor 50 in the reverse direction.

As mentioned earlier, translation by the circuit card 110 of the forward or reverse command into the forward or reverse control signals may be conditional. As will be explained in more details below, the circuit card 110 considers a voltage present across the shunt resistor connected between the battery ground port 114 and the contact port 118 of the circuit card 110. Any current flowing through the motor 50 also flows through the shunt resistor. Consequently, a voltage across the shunt resistor that exceeds a predetermined voltage threshold is indicative of an excessive current flowing through the motor 50 or, equivalently, is indicative of an excess power demand of the motor 50. This situation may occur for example when a winch cable is stuck or when the user attempts to use the winch to pull and excessive charge. The circuit card 110 may refrain from sending the forward or reverse control signal in such situations.

The bypass switch 150, if present in a given implementation, is connected to the common switch port 122 via a lead 152 and to a bypass port 154 via a lead 156. When the user depresses the bypass switch 150 while holding the user-operable switch 60 in the forward or reverse position, the circuit card 110 unconditionally sends the forward or reverse control signal applied via the leads 136 to the coil 30 of the forward relay 26.

In at least one implementation, the circuit card 110 may be integrated in a device that can safely operate without condition in one direction while benefiting from conditional operation in another direction. In such an implementation, translation of the forward command into the forward control signal may be unconditional while translation of the reverse command into the reverse control signal is conditional.

Figure 3:
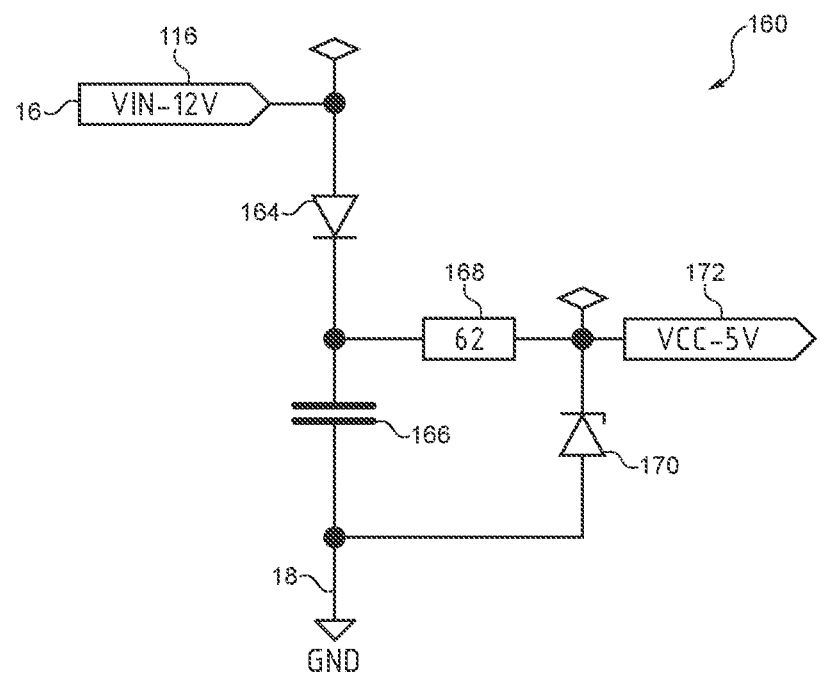
FIG. 3 is an electrical diagram of a voltage conditioner mounted on the circuit card.

Additional details of the circuit card 110 are shown on FIGS. 3 to 7. FIG. 3 is an electrical diagram of a voltage conditioner mounted on the circuit card. A voltage conditioner 160 includes the nominal voltage port 116 connected to the positive terminal 12 of the battery 10 via the leads 16, and the battery ground port 114 connected to the negative terminal 14 of the battery 10 via the leads 18. A diode 164, a capacitor 166 and a resistor 168 condition the nominal voltage to a point where a 5-volt Zener diode 170 is connected, the voltage conditioner 160 forming a 5-volt source 172 used by various components of the circuit card 110

Figure 4:
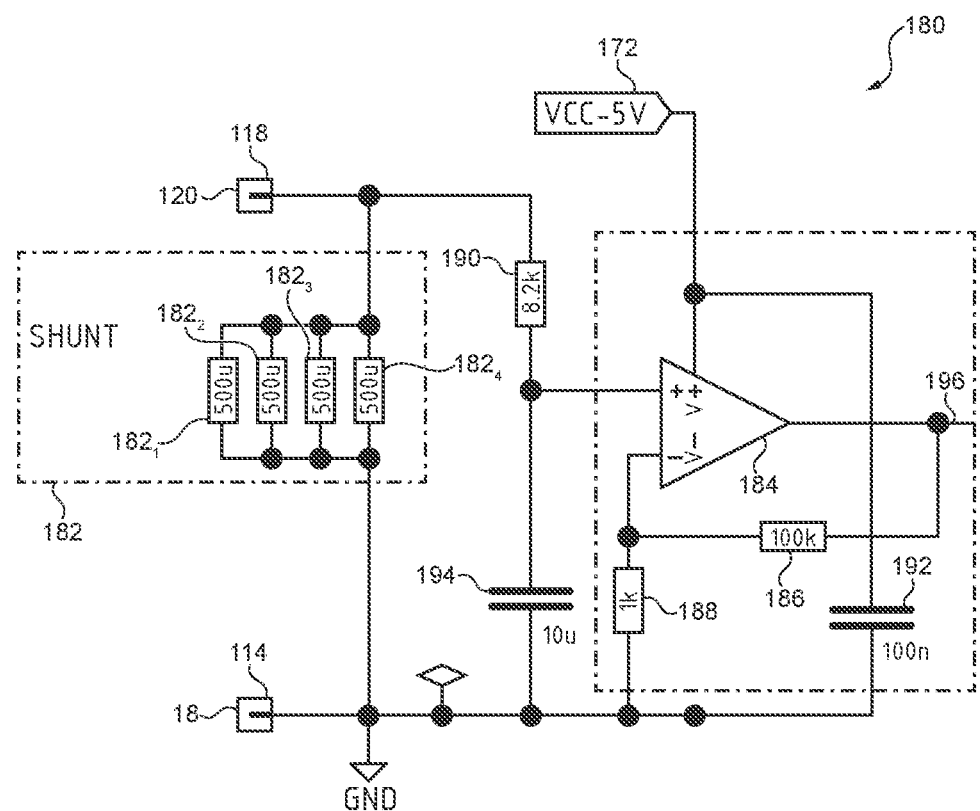
FIG. 4 is an electrical diagram of a current sensor mounted on the circuit card.

FIG. 4 is an electrical diagram of a current sensor mounted on the circuit card. A current sensor 180 includes a shunt resistor 182 connected in series with the battery ground port 114 and the contact port 118 of the circuit card 110. Considering at once FIGS. 2 and 4, current that flows through the motor 50 also flows through the shunt resistor 182. As illustrated, the shunt resistor 182 is formed of four (4) resistors 182₁, 182₂, 182₃ and 182₄ that are mounted in parallel so that they each withstand a quarter of the current flowing through the motor 50. A voltage across the shunt resistor 182 is proportional to the current that flows through the motor 50. This voltage is amplified by an amplifier, for example an operational amplifier 184. The operational amplifier is fed by the 5-volt source 172 and is also connected to the GND reference. Resistors 186, 188 and 190 define a gain of the operational amplifier 184 while capacitors 192, 194, together with the resistors 186, 188 and 190 filter voltage measurements on the shunt resistor 182. A signal 196 output from the operational amplifier 184 provide a measurement of the current flowing through the motor 50.

Figure 5:
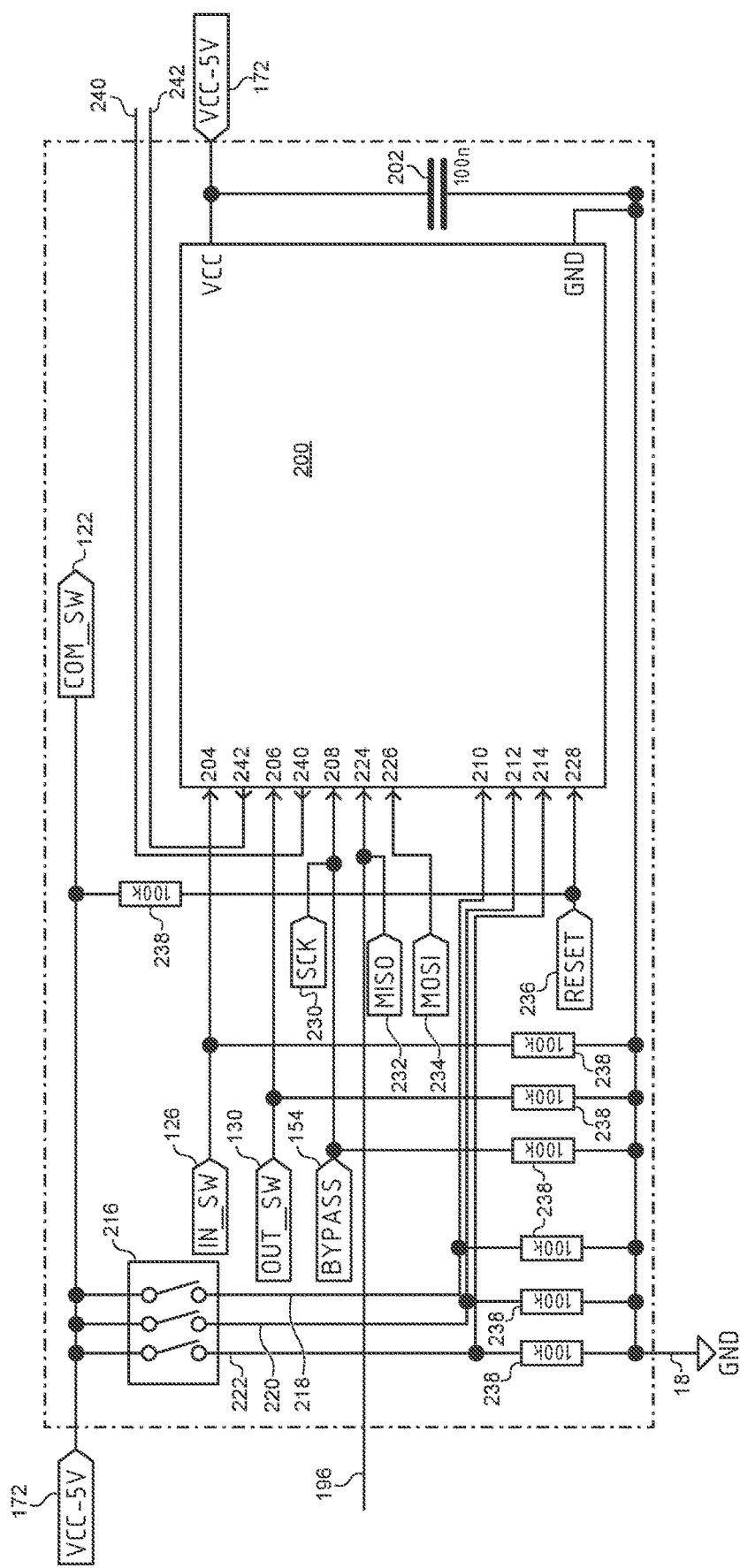
FIG. 5 shows a microcontroller and its connections to various components of the circuit card of FIG. 2.

FIG. 5 shows a microcontroller and its connections to various components of the circuit card of FIG. 2. A microcontroller 200 is for example an ATtiny24™ processor from ATMEL® of San Jose, Calif. The microcontroller 200 is energized by the 5-volt source 172 and is connected to the GND reference. A capacitor 202 filters the voltage present at the 5-volt source 172. The microcontroller 200 includes input ports 204, 206 and 208 respectively connected to the in switch port 126, the out switch port 130 and to the bypass port 154 of the circuit card 110. Other input ports 210, 212 and 214 are respectively connected to outputs 218, 220 and 222 of a dual-inline package (DIP) switch 216. The DIP switch 216 is connected to the 5-volt source 172 and to the input ports 210, 212 and 214 so that opening and closing of the various internal switches of the DIP switch 216 applies signals to various combinations of the input ports 210, 212 and 214. The processor 200 uses the signals applied on these input ports 210, 212 and 214 to define an allowable value for the measurement of the current flowing through the motor 50, which is represented by the signal 196 from the operational amplifier 184, this signal 196 being present on an input port 224 of the microcontroller 200. The allowable value for the measurement of the current flowing through the motor 50. This allowable current measurement translates into a predetermined power threshold for the motor 50.

Programming of the microcontroller 200 is made via signals applied at the input ports 208 and 224 and also at further input ports 226 and 228. Programming signals comprise a serial clock input (SCK) 230, a serial data output (MISO) 232, a serial data input (MOSI) 234 and a RESET 236. Details of the manner of programming of the microcontroller 200 are beyond of the scope of the present disclosure.

The various input ports of the microcontroller 200 are buffered by resistors 238 that individually link these ports to the GND reference.

The microcontroller has an output port 240 for outputting a reverse control signal and an output port 242 for outputting a forward control signal.

Figure 6:
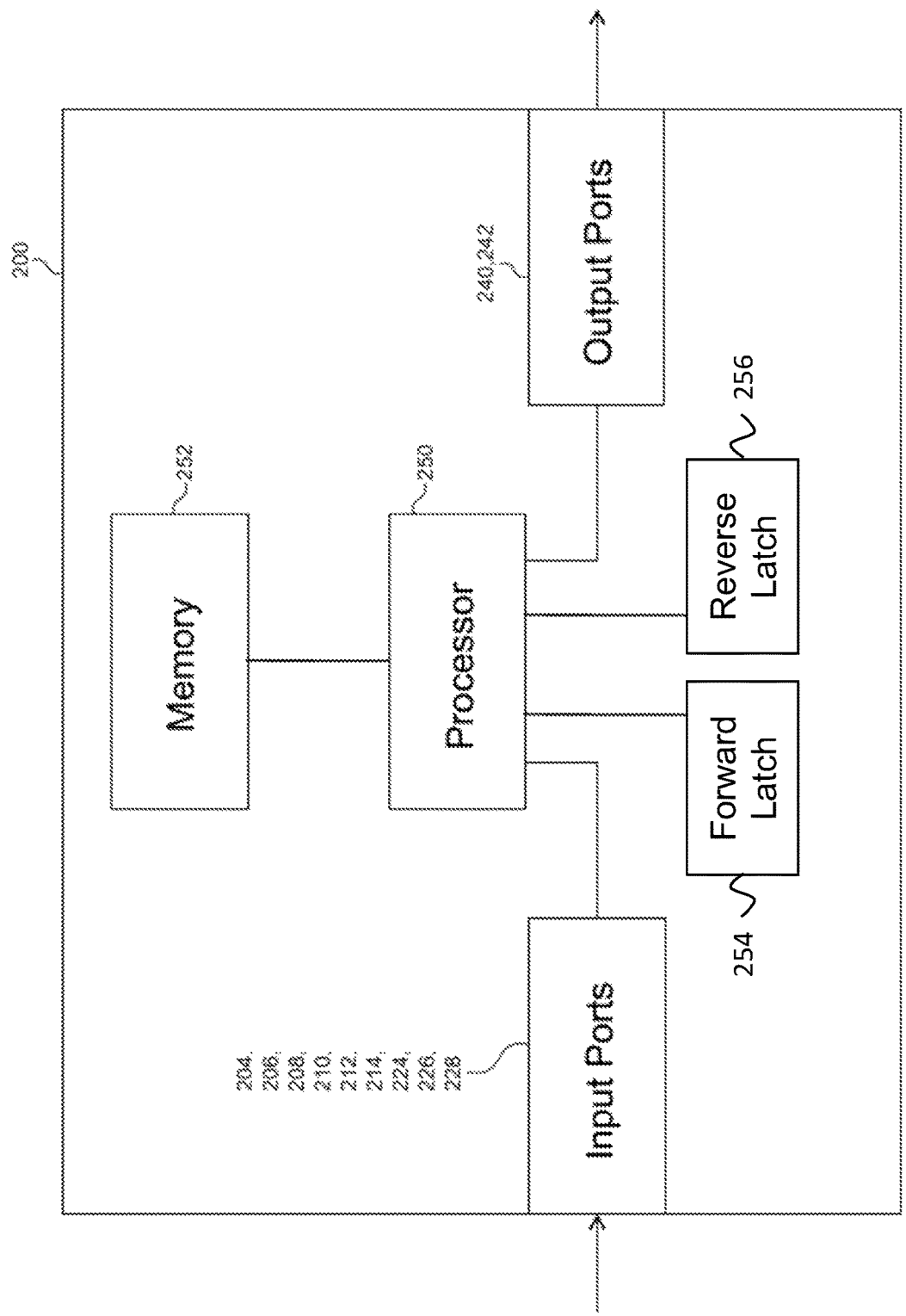
FIG. 6 is a schematic representation of the microcontroller of FIG. 5.

FIG. 6 is a schematic representation of the microcontroller of FIG. 5. The microcontroller 200 includes a processor 250 operably connected to the input ports 204, 206, 208, 210, 212, 214, 224, 226 and 228, to the output ports 240 and 242, and to a memory 252. Programming information received at the input ports 208, 224, 226 and 228 is stored in the memory 252 by the processor 250.

Figure 7:
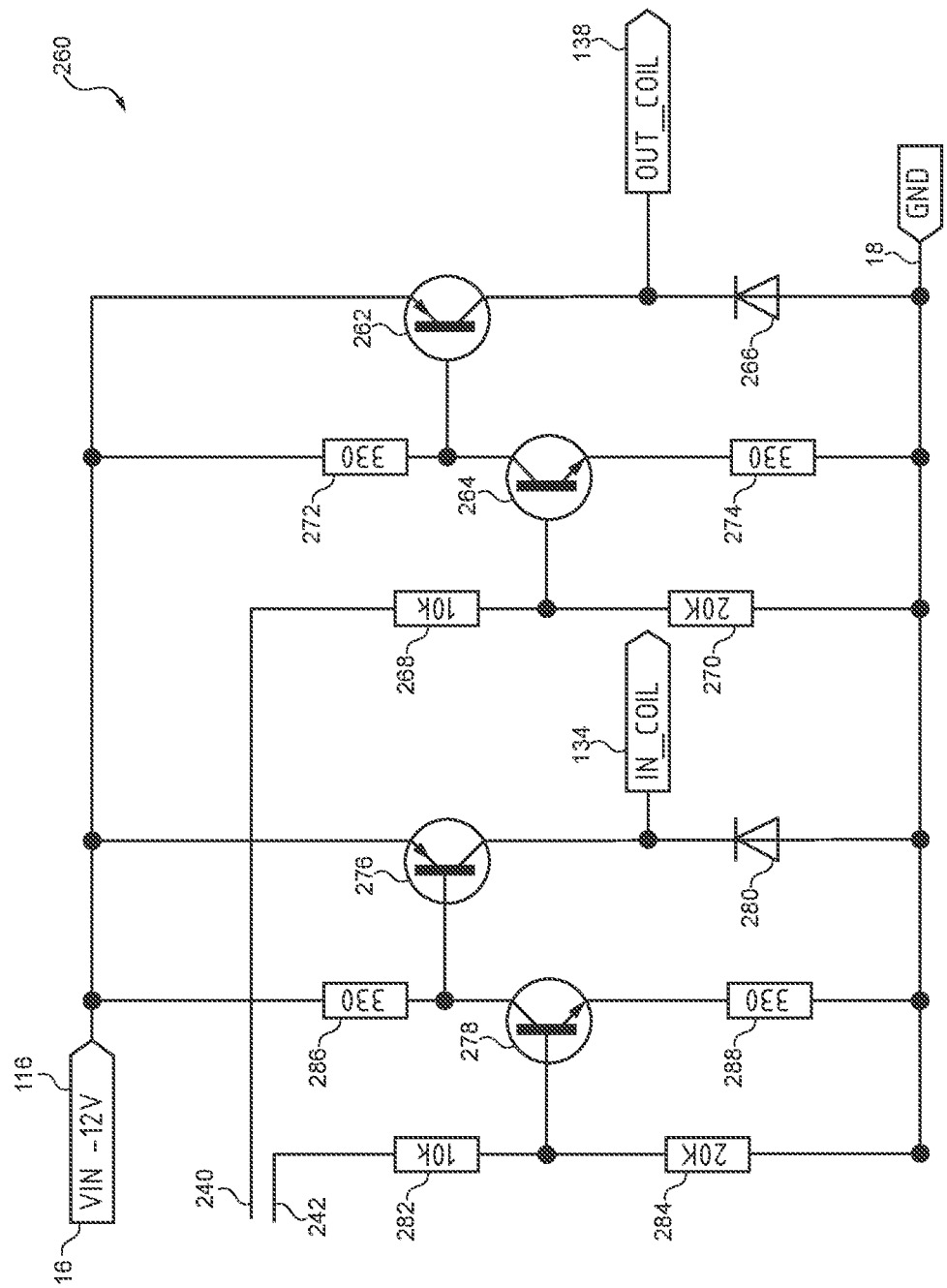
FIG. 7 is a circuit diagram of an amplifier stage for the circuit card of FIG. 2.

FIG. 7 is a circuit diagram of an amplifier stage for the circuit card of FIG. 2. An amplifier stage 260 amplifies the reverse control signal available at the output port 240 of the microcontroller 200 and the forward control signal available at the output port 242 of the microcontroller 200. These control signals are amplified independently.

An amplifier of the reverse control signal comprises a PNP transistor 262, an NPN transistor 264 and a diode 266, an impedance and a gain of the amplifier being defined by resistors 268, 270, 272 and 274. The amplifier is energized by the nominal voltage port 116. An output of the PNP transistor 262 forms the reverse control signal available at the out coil port 138 and applied to the coil 30 of the reverse relay 28.

An amplifier of the forward control signal comprises a PNP transistor 276, an NPN transistor 278 and a diode 280, an impedance and a gain of the amplifier being defined by resistors 282, 284, 286 and 288. The amplifier is energized by the nominal voltage port 116. An output of the PNP transistor 276 forms the forward control signal available at the in coil port 134 and applied to the coil 30 of the forward relay 26.

The processor 250 of the microcontroller 200 is programmed to operate as follows. When the user leaves the user-operable switch 60 in the neutral position, no signal is present at any of the in switch port 126 and the out switch port 130 of the circuit card 110 (input ports 204 and 206 of the microcontroller 200, respectively). The microcontroller 200 does not apply any signal at the output ports 240 and 242. No forward or reverse control signal is amplified by the amplifier stage 260 so none of the coils 30 of the forward and reverse relays 26 and 28 is activated. The motor 50 is not energized.

When the user places the user-operable switch 60 in the forward position, a 5-volt signal appears at the in switch port 126 of the circuit card 110 (input port 204). The microcontroller 200 resets an internal reverse latch 256, if previously set, and conditionally causes the output port 242 to issue the forward control signal. The microcontroller 200 considers the status of an internal forward latch 254 as well as the signal 196 received on the input port 224, which provides a measurement of the current flowing through the motor 50 (and through the shunt resistor 182). Statuses of the outputs 218, 220 and 222 of the DIP switch 216, respectively received at the input ports 210, 212 and 214, and a status of the bypass switch 150 present on the bypass port 154 of the circuit card 110 and received at the input port 208 of the microcontroller 200 are also considered. Various configurations of the DIP switch 216 are used to select one of up to eight (8) distinct thresholds for the current flowing through the motor 50. If the forward latch 254 is not set and if the signal 196 indicates that the current flowing through the motor 50 does not exceed the selected threshold, the microcontroller 200 causes the output port 242 to issue the forward control signal. If the current flowing through the motor 50 exceeds the selected threshold or if the forward latch 254 is set, the microcontroller 200 may allow the output port 242 to issue the forward control signal if, at the time, the microcontroller 200 detects, by consideration of its input port 208, that the bypass switch 150 is depressed by the user. Otherwise, when the bypass switch 150 is not in use and the current flowing through the motor 50 exceeds the selected threshold, the microcontroller 200, disallows issuance of the forward control signal by the output port 242 and sets the forward latch 254.

If conditions allow and the forward control signal is issued at the output port 242, it is amplified by the amplifier stage 260 and applied to the coil 30 of the forward relay 26, causing the motor 50 to rotate in the forward direction. It will be understood that when the user places the user-operable switch 60 in the forward position, the microcontroller 200 may initially allow issuance of the forward control signal, following which the current flowing through the motor 50 may increase to the point of exceeding the selected threshold, causing the setting of the forward latch 254 and the termination of the forward control signal although the user-operable switch 60 is maintained in the forward position.

When the user places the user-operable switch 60 in the reverse position, a 5-volt signal appears at the out switch port 130 of the circuit card 110 (input port 206). The microcontroller 200 resets the forward latch 254, if previously set, and conditionally causes the output port 240 to issue the reverse control signal. The microcontroller 200 considers the status of the reverse latch 256 as well as the signal 196 received on the input port 224, which provides the measurement of the current flowing through the motor 50 (and through the shunt resistor 182). An actual threshold for the current flowing through the motor 50 is still selected based on the configuration of the DIP switch 216. If the reverse latch 256 is not set and if the signal 196 indicates that the current flowing through the motor 50 does not exceed the selected threshold, the microcontroller 200 causes the output port 240 to issue the reverse control signal. If the current flowing through the motor 50 exceeds the selected threshold or if the reverse latch 256 is set, the microcontroller 200 may allow the output port 240 to issue the reverse control signal if, at the time, the microcontroller 200 detects, by consideration of its input port 208, that the bypass switch 150 is depressed by the user. Otherwise, when the bypass switch 150 is not depressed and the current flowing through the motor 50 exceeds the selected threshold, the microcontroller 200, disallows issuance of the reverse control signal by the output port 240 and sets the forward latch 254.

If conditions allow, the output port 240 issues the reverse control signal, which is amplified by the amplifier stage 260. The reverse control signal is applied to the coil 30 of the reverse relay 28, causing the motor 50 to rotate in the reverse direction. It will be understood that when the user places the user-operable switch 60 in the reverse position, the microcontroller 200 may initially allow issuance of the reverse control signal, following which the current flowing through the motor 50 may increase and exceed the selected threshold, causing the setting of the reverse latch 256 and the termination of the reverse control signal although the user-operable switch 60 is maintained in the reverse position.

It is contemplated that, in an implementation, the forward latch 254 may be unconditionally be reset when the user-operable switch 60 is in the reverse position and the forward latch 254 may be unconditionally be reset when the user-operable switch 60 is in the forward position.

Figure 8:
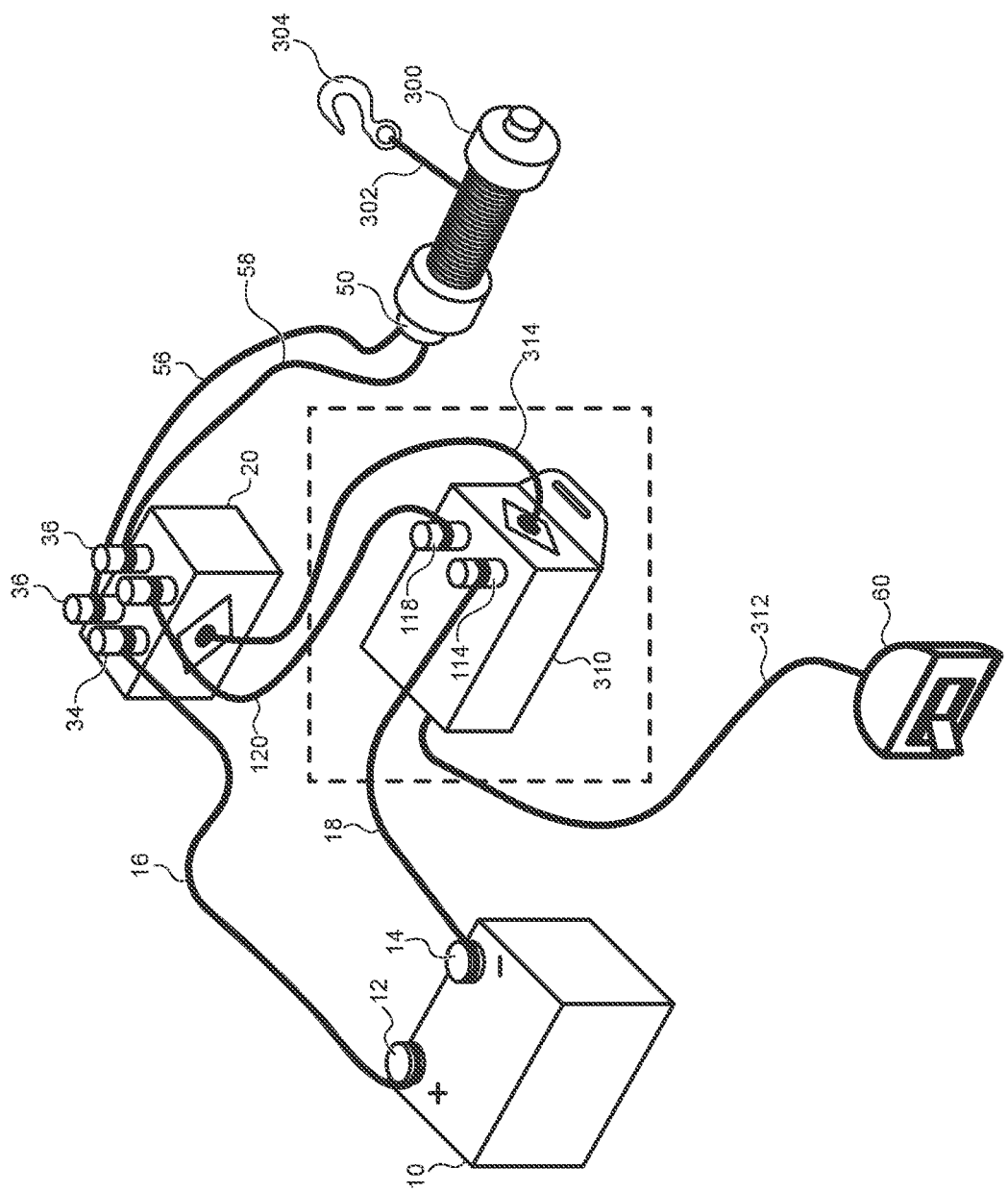
FIG. 8 is a schematic representation of a winch controlled by the circuit of FIG. 2.

FIG. 8 is a schematic representation of a winch controlled by the circuit of FIG. 2. A winch 300 comprises a cable roll (not shown) on which a cable 302 is wound. A proximal end of the cable 302 is fixedly attached to the cable roll. A hook 304 may be attached to a distal end of the cable 302. The cable roll is connected to the motor 50 so that it rotates in the forward and reverse directions as does the motor 40. The circuit card 110 of FIG. 2 is integrated in a control box 310. The leads 124, 128 and 132 that connect the user-operable switch 60 to the circuit card 110 are integrated in an electrical cable 312. Likewise, the leads 16, 136 and 140 that connect the circuit card 110 to the reversible contactor 20 are integrated in an electrical cable 314. In the illustrated implementation of FIG. 8, continuous rotation of the cable roll after complete unwinding of the cable 302 may cause the cable 302 to become wound again on the cable roll. It is contemplated that, in another implementation, the winch 300 may be constructed so that the cable 302 can only be wound on the cable roll in one direction and not in the opposite direction.

Figure 9:
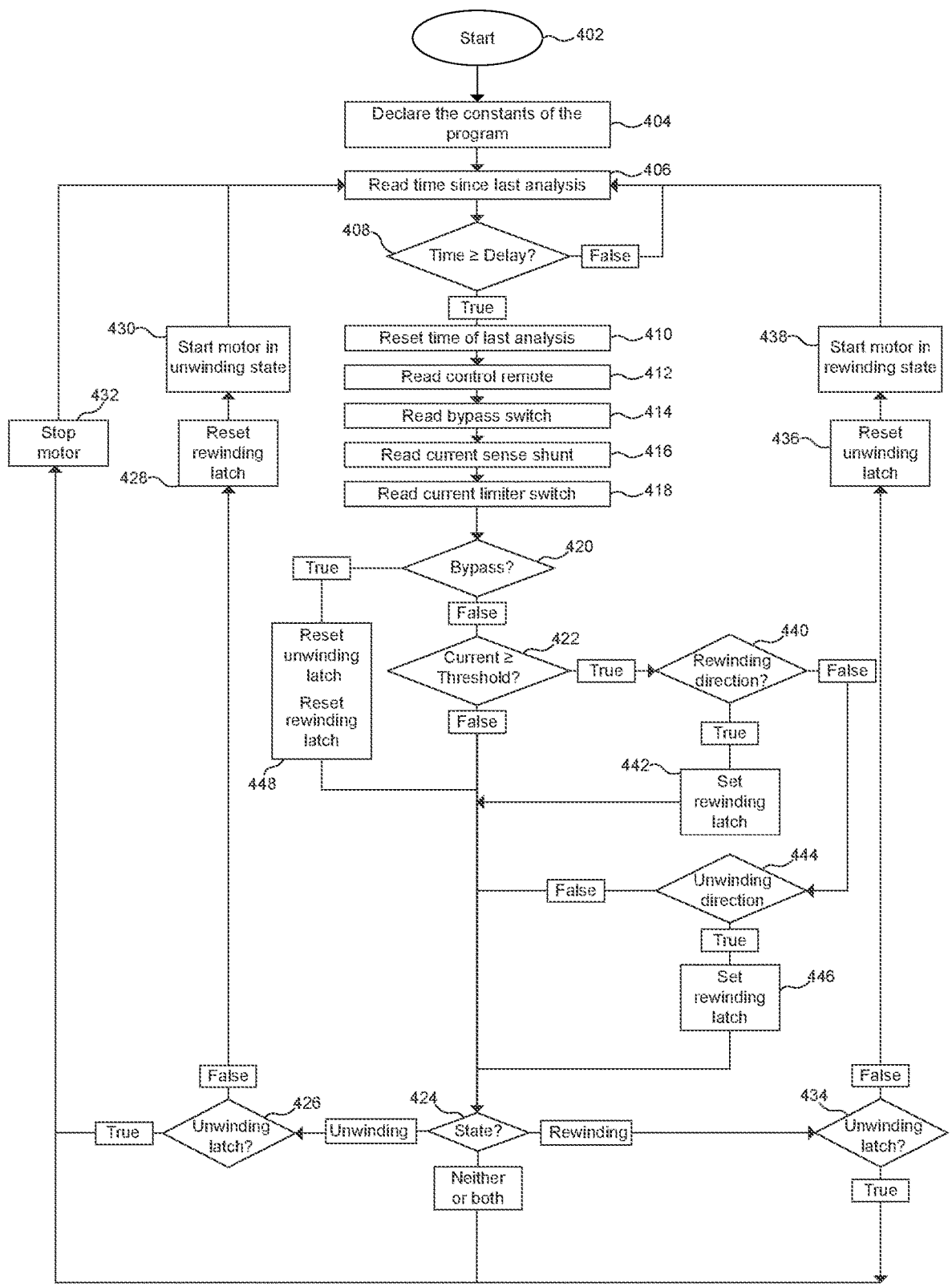
FIG. 9 is a sequence diagram of a method for controlling electric power delivered to an electric motor.

FIG. 9 is a sequence diagram of a method for controlling electric power delivered to an electric motor. On FIG. 9, a sequence 400 comprises a plurality of operations that may be executed in variable order, some of the operations possibly being executed concurrently, some of the operations being optional. Each of the operations of the sequence 400 may be configured to be processed by one or more processors, for example the processor 250 of FIG. 6, the one or more processors being coupled to a memory, for example the memory 252 of FIG. 6. The sequence 400 may be applied to various applications including without limitation in the context of the microcontroller 200 configured for operation of the winch 300.

The sequence 400 starts at operation 402 when power is initially apply to the microcontroller 200. Constants of an internal program of the microcontroller 200 are declared at operation 404. A loop is formed between operations 406 and 408. This loop is used implement a delay between readings of the position of the user-operable switch 60, to prevent impacts from eventual bouncing of the user-operable switch 60. Without limiting the present disclosure, the loop may implement a delay on the order of about 100 milliseconds. A time since a last analysis, which may be stored in the memory 252, is read at operation 406. If that time is less than a predetermined delay, at operation 408, the sequence 400 returns to operation 406. If the time has exceeded the predetermined delay at operation 408, the process continues at operation 410 where the time is reset in view of an eventual return to operation 406.

A position of the user-operable switch 60 is read at operation 412. A current flowing through the shunt resistor 182 is read at operation 414 in order to sense a level of electric power delivered to the motor 50. A status of the bypass switch 150 is read at operation 416. A configuration of the DIP switch 216, as applied to the input ports 210, 212 and 214 of the circuit card 110, is read at operation 418 to define the allowable value for the measurement of the current flowing through the shunt resistor 182. The status of the bypass switch 150 is considered at operation 420. Assuming that the bypass switch 150 is not depressed by the user, which is a normal operational condition, the sequence 400 continues with operation 422 for verifying a level of the current flowing through the shunt resistor 182. If the current does not exceed the allowable current measurement, the sequence 400 continues at operation 424 where the position of the user-operable switch 60 is verified. If the user-operable switch 60 is in the reverse (unwinding) position, operation 426 verifies that a reverse (unwinding) latch is not set. If the reverse (unwinding) latch is not set, a forward (rewinding) latch is reset (whether or not it was previously set) at operation 428 and the motor 50 is allowed to start rotating in the reverse (unwinding) direction at operation 430. The process returns to operation 406 while the motor 50 is rotating in the reverse direction. If, however, operation 426 determines that the reverse (unwinding) latch is set, the motor 50 is stopped at operation 432 and the sequence 400 returns to operation 406.

Continuing with the description of operation 424, if the user-operable switch 60 is in the forward (rewinding) position, operation 426 verifies that the forward (rewinding) latch is not set. If the forward (rewinding) latch is not set, the reverse (unwinding) latch is reset (whether or not it was previously set) at operation 436 and the motor 50 is allowed to start rotating in the forward (rewinding) direction at operation 438. The process returns to operation 406 while the motor 50 is rotating in the forward direction. If, however, operation 434 determines that the forward (rewinding) latch is set, the motor 50 is stopped at operation 432 and the sequence 400 returns to operation 406.

Still continuing with the description of operation 424, if the user-operable switch 60 is in the neutral position, the motor 50 is stopped at operation 432 and the sequence 400 returns to operation 406.

Returning to the description of operation 422, if the current flowing through the shunt resistor 182 exceeds the allowable current measurement, the sequence 400 continues at operation 440 where the position of the user-operable switch 60 is verified. If the user-operable switch 60 is in the forward (rewinding) position, the forward (rewinding) latch is set at operation 442 and the sequence 400 continues at operation 424, following which it is expected that operation 434 will cause stopping the motor 50 at operation 432. If the user-operable switch 60 is not in the forward (rewinding) position at operation 440, operation 444 verifies whether the user-operable switch 60 is in the reverse (unwinding) position. At operation 444, the user-operable switch 60 might have just returned to the neutral position, in which case the user-operable switch 60 may not be in the reverse (unwinding) position. In that case, the sequence continues at operation 424 where it is determined, because the user-operable switch 60 is in the neutral position, that the sequence should proceed to operation 432 and stopping the motor 50. If operation 444 determines that the user-operable switch 60 is in the reverse (unwinding) position, the reverse (unwinding) latch is set at operation 446 and the sequence 400 continues at operation 424, following which it is expected that operation 426 will cause stopping the motor 50 at operation 432.

Returning to the description of operation 420, if the bypass switch 150 is depressed by the user, both the reverse (unwinding) and forward (rewinding) latches are reset at operation 448. Independently of the current flowing through the shunt resistor 182, the sequence 400 continues at operation 424. If the user-operable switch 60 is in one of the forward or reverse positions, the motor 50 is started unconditionally at operation 430 or 438 because both the reverse (unwinding) and forward (rewinding) latches have been reset at operation 448.

Because of the loop implemented in operations 406 and 408, forward or reverse operation of the motor 50 is not expected to be impacted by a very brief release of the user-operable switch 60, caused for example by bouncing within the user-operable switch 60. At the conclusion of the delay implemented by the loop of operations 406 and 408, the position of the user-operable switch 60, the status of the bypass switch 150 and the current flowing through the shunt resistor 182 are evaluated again at operations 412, 414 and 416, respectively, the sequence 400 continuing again at operation 418 and so on.

Those of ordinary skill in the art will realize that the description of the circuit and method for controlling electric power delivered to an electric motor are illustrative only and are not intended to be in any way limiting. Other embodiments will readily suggest themselves to such persons with ordinary skill in the art having the benefit of the present disclosure. Furthermore, the disclosed circuit and method may be customized to offer valuable solutions to existing needs and problems related to control of a winch and to control of any other mechanical device coupled to an electric motor. In the interest of clarity, not all of the routine features of the implementations of the circuit and method for controlling electric power delivered to an electric motor are shown and described. In particular, combinations of features are not limited to those presented in the foregoing description as combinations of elements listed in the appended claims form an integral part of the present disclosure. It will, of course, be appreciated that in the development of any such actual implementation of the circuit and method for controlling electric power delivered to an electric motor, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of power electronics having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A circuit for controlling electric power delivered to an electric motor, comprising:
   an input port configured to receive a first command and a second command;
   an output port configured to transmit a first control signal and a second control signal;
   a sensor of the electric power delivered to the electric motor; and
   a processor electrically connected to the input port, to the output port and to the sensor, the processor being configured to:
   cause the output port to transmit the first control signal when the input port receives the first command while a first latch is not set,
   set the first latch and causing the output port to stop transmitting the first control signal when a level of the electric power delivered to the electric motor exceeds a power threshold while the input port receives the first command,
   reset the first latch and causing the output port to transmit the second control signal when the input port receives the second command,
   cause the output port to stop transmitting the first and second control signals when no command is present at the input port,
   reset a second latch when the input port receives the first control signal, and
   set the second latch and cause the output port to stop transmitting the second control signal when the level of the electric power delivered to the electric motor exceeds the power threshold while the input port receives the second command.

2. The circuit of claim 1, wherein the first and second latches are software latches.

3. The circuit of claim 1, wherein:
   the sensor comprises a shunt resistor connectable in series with the electric motor and an amplifier of a voltage across the shunt resistor, the amplifier providing an electric current value; and
   the processor is further configured to determine the level of the electric power delivered to the electric motor based on the electric current value.

4. The circuit of claim 1, further comprising one or more configuration switches electrically connected to the processor and configured to configure a value of the power threshold.

5. The circuit of claim 1, wherein the processor is further configured to:
   start a timer when the input port receives one of the first and second commands;
   stop the timer after a predetermined time delay; and
   ignore any additional signal present at the input port while the timer is not stopped.

6. A device for controlling electric power delivered to an electric motor, comprising:
   the circuit of claim 1;
   a user-operable switch electrically connected to the input port, the user-operable switch having a first position for providing the first command, a second position for providing the second command, and a neutral position;
   a reversible contactor electrically connected to the output port and configured to selectively connect the electric motor to a power source to cause the electric motor to operate in a first direction when receiving the first control signal at the reversible contactor and to cause the electric motor to operate in a second direction when receiving the second control signal at the reversible contactor.

7. The device of claim 6, further comprising a bypass switch electrically connected to the input port, wherein the processor is further configured to unconditionally reset the first latch when the bypass switch issues a bypass command.

8. The device of claim 6, wherein the circuit further comprises an amplifier stage electrically connected to the processor and to the reversible contactor, the amplifier stage having a first amplifier of the first control signal and a second amplifier of the second control signal.

9. The device of claim 8, wherein the reversible contactor comprises:
   a first coil electrically connected to the first amplifier and responsive to the amplified first control signal to close a first contactor for causing delivery of electric power to the electric motor to cause the electric motor to operate in the first direction; and
   a second coil electrically connected to the second amplifier and responsive to the amplified second control signal to close a second contactor for causing delivery of electric power to the electric motor to cause the electric motor to operate in the second direction.

10. A winch, comprising:
    an electric motor electrically connectable to a battery;
    a cable roll operatively connected to the electric motor;
    a cable having one end fixedly attached to the cable roll; and
    the device of claim 6;
    wherein operating the electric motor in the second direction causes rotating the cable roll in a reverse direction to allow unwinding the cable from the cable roll; and
    wherein operating the electric motor in the first direction causes the cable roll to be driven in a forward direction for winding the cable on the cable roll.

11. A method implemented in a controller for controlling electric power delivered to an electric motor, comprising:
- receiving, at the controller, one of a first command and a second command;
- sensing, at the controller, the electric power delivered to the electric motor;
- when the second command is received at the controller, resetting a first latch at the controller and transmitting a second control signal from the controller to a reversible contactor electrically connected to the electric motor and to a power source, the second control signal causing the reversible contactor to deliver current from the power source to the electric motor to cause the electric motor to operate in a second direction;
- when the first command is received at the controller while the first latch is not set, transmitting a first control signal from the controller to the reversible contactor, the first control signal causing the reversible contactor to deliver current from the power source to the electric motor to cause the electric motor to operate in a first direction;
- setting, at the controller, the first latch and terminating transmission of the first control signal when the level of the electric power delivered to the electric motor exceeds the power threshold while the first command is being received at the controller;
- terminating, at the controller, transmission of the first and second control signals when none of the first and second command is received;
- resetting a second latch when the controller receives the first control signal; and
- setting, at the controller, the second latch and terminating transmission of the second control signal when the level of the electric power delivered to the electric motor exceeds the power threshold while the second command is being received at the controller.

12. The method of claim 11, wherein the power source comprises a battery.

13. A method of controlling a winch operatively connected to an electric motor, comprising:
- receiving, at a controller from a user-operable switch, one of a first command and a second command;
- sensing, at the controller, a level of electric power delivered to the electric motor;
- when the second command is received at the controller, resetting a first latch at the controller and transmitting a second control signal from the controller to a reversible contactor electrically connected to the electric motor and to a power source, the second control signal causing the reversible contactor to deliver current from the power source to the electric motor to cause the electric motor and the winch to operate in a reverse direction;
- when the first command is received at the controller while the first latch is not set, transmitting a first control signal from the controller to the reversible contactor, the first control signal causing the reversible contactor to deliver current from the power source to the electric motor to cause the electric motor and the winch to operate in a forward direction;
- setting, at the controller, the first latch and terminating transmission of the first control signal when the level of the electric power delivered to the electric motor exceeds the power threshold while the first command is being received at the controller;
- terminating, at the controller, transmission of the first and second control signals when none of the first and second command is received;
- resetting a second latch when the controller receives the first control signal;
- setting, at the controller, the second latch and terminating transmission of the second control signal when the level of the electric power delivered to the electric motor exceeds the power threshold while the second command is being received at the controller.

14. The method of claim 13, wherein:
- operating the winch in the reverse direction causes rotating a cable roll in the reverse direction to allow unwinding a cable from the cable roll; and
- operating the winch in the forward direction causes the cable roll to be driven in the forward direction for winding the cable on the cable roll.

* * * * *